United States Patent
Lin et al.

(10) Patent No.: US 7,409,195 B2
(45) Date of Patent: Aug. 5, 2008

(54) WIRELESS MODEM

(75) Inventors: Ernie Lin, North Andover, MA (US); Adolf J. Giger, Boxford, MA (US)

(73) Assignee: Nebo Wireless, LLC, North Andover, MA (US)

( * ) Notice: Subject to any disclaimer, the term of this patent is extended or adjusted under 35 U.S.C. 154(b) by 0 days.

(21) Appl. No.: 10/723,442

(22) Filed: Nov. 26, 2003

(65) Prior Publication Data

US 2004/0171348 A1 Sep. 2, 2004

Related U.S. Application Data

(63) Continuation-in-part of application No. 09/658,049, filed on Sep. 8, 2000.

(60) Provisional application No. 60/435,442, filed on Dec. 20, 2002.

(51) Int. Cl.
  *H01Q 11/12* (2006.01)
  *H04B 1/04* (2006.01)

(52) U.S. Cl. .................. 455/127.2; 455/41.2; 455/63.1; 455/74; 455/74.1; 455/557; 455/558; 455/127.1; 455/522; 375/222; 379/390.03; 379/390.04; 379/395

(58) Field of Classification Search ....... 455/41.1–41.2, 455/63.1, 74, 74.1, 78, 550.1, 552.1, 556.1–556.2, 455/557–558, 114.2–114.3, 127.1–127.2, 455/522; 375/220–222; 379/386, 423, 388.03–388.06, 379/390.03–390.04, 395
See application file for complete search history.

(56) References Cited

U.S. PATENT DOCUMENTS

| | | | |
|---|---|---|---|
| 4,003,006 A | 1/1977 | Mandeville et al. | |
| 4,171,469 A | 10/1979 | Brooks | |
| 4,523,155 A | 6/1985 | Walczak et al. | |
| 4,727,535 A * | 2/1988 | Brandt | 398/41 |
| 4,813,073 A | 3/1989 | Ling | |
| 4,835,765 A | 5/1989 | Bergmans et al. | |
| 4,970,715 A | 11/1990 | McMahan | |
| 5,267,310 A | 11/1993 | Yoshiba | |
| 5,297,203 A | 3/1994 | Rose et al. | |

(Continued)

FOREIGN PATENT DOCUMENTS

JP  405095412  4/1993

OTHER PUBLICATIONS

International Search Report for Application PCT/US03/35527.

*Primary Examiner*—Tuan A Tran
(74) *Attorney, Agent, or Firm*—Occhiuti Rohlicek & Tsao LLP (57) ABSTRACT

A modem includes a base unit for transmitting a data signal, and a communication card which receives the data signal from the base unit over a wireless medium and which performs echo canceling on the data signal. The base unit is in communication with a telephone line and receives an original signal from the telephone line. The base unit generates an RF modulated signal based on the original signal. The base unit includes a transmitter for transmitting the data signal. Circuitry in the base unit receives the original signal from the telephone line and generates a combined data signal from the original signal and echo signals and maintains a peak voltage of the combined signal which is within the linear amplification region of the transmitter.

8 Claims, 6 Drawing Sheets

U.S. PATENT DOCUMENTS

| | | | |
|---|---|---|---|
| 5,367,563 A * | 11/1994 | Sainton | 379/93.29 |
| 5,553,318 A | 9/1996 | Ohmagari et al. | |
| 5,587,998 A | 12/1996 | Velardo, Jr. et al. | |
| 5,627,857 A | 5/1997 | Wilson | |
| 5,711,012 A | 1/1998 | Bottoms et al. | |
| 5,812,537 A | 9/1998 | Betts et al. | |
| 5,819,165 A | 10/1998 | Hulkko et al. | |
| 5,873,039 A * | 2/1999 | Najafi | 455/454 |
| 5,926,756 A | 7/1999 | Piosenka et al. | |
| 5,930,719 A * | 7/1999 | Babitch et al. | 455/462 |
| 5,955,921 A | 9/1999 | Ide et al. | |
| 5,978,689 A | 11/1999 | Tuoriniemi et al. | |
| 6,070,058 A | 5/2000 | Waldroup et al. | |
| 6,072,998 A | 6/2000 | Kaku | |
| 6,147,979 A | 11/2000 | Michel et al. | |
| 6,172,985 B1 | 1/2001 | Gilbert | |
| 6,289,213 B1 | 9/2001 | Flint et al. | |
| 6,477,250 B1 | 11/2002 | Sheets | |
| 6,505,222 B1 | 1/2003 | Davis et al. | |
| 6,522,640 B2 * | 2/2003 | Liebenow | 370/338 |
| 6,591,090 B1 | 7/2003 | Vuorio et al. | |
| 6,611,681 B2 * | 8/2003 | Henderson | 455/413 |
| 6,711,391 B1 | 3/2004 | Walker et al. | |
| 6,745,055 B1 | 6/2004 | Iyengar et al. | |
| 6,751,474 B1 | 6/2004 | Lin et al. | |
| 6,763,228 B2 | 7/2004 | Prentice et al. | |
| 2002/0049036 A1 * | 4/2002 | Bullock et al. | 455/3.05 |

* cited by examiner

WIRELESS MODEM

CROSS-REFERENCE TO RELATED APPLICATIONS

This application is a continuation-in-part of U.S. patent application Ser. No. 09/658,049, filed on Sep. 8, 2000, the contents of which are hereby incorporated by reference into this application as if set forth herein in full. This application claims priority to U.S. Provisional Application No. 60/435,442, filed on Dec. 20, 2002, the contents of which are hereby incorporated by reference into this application as if set forth herein in full.

TECHNICAL FIELD

This application relates to a wireless modem.

BACKGROUND

Computers typically connect to networks, such as the Internet, through a "wired" device, such as a modem. Wired, in this context, refers to wired connections, such as telephone lines, Ethernet cable, and the like.

There are limitations associated with the use of wired devices. For example, wired devices have limited portability, since their operation is dependent upon on a wired connection. The installation options for wired devices are also limited, since wired devices require a nearby telephone jack or outlet.

SUMMARY

In general, in one aspect, the invention is a modem that includes a base unit for transmitting a data signal and a communication card which receives the data signal from the base unit over a wireless medium, and which performs echo canceling on the data signal. This aspect may include one or more of the following features.

The base unit is in communication with a telephone line and receives an original signal from the telephone line. The base unit generates an RF modulated signal based on the original signal. The base unit includes a transmitter for transmitting the data signal and circuitry which receives the original signal from the telephone line and which generates the data signal from the original signal by maintaining a peak voltage of combined original and echo signals within a linear amplification region of the transmitter. The circuitry in the base unit may be an automatic gain control circuit.

The data signal may be transmitted using frequency shift keying (FSK) modulation. The base unit may transmit the data signal over a frequency channel of the wireless medium.

In general, in another aspect, the invention is a modem that includes a base unit and a communication card for transmitting data signals to, and receiving data signals from, the base unit. The communication card includes a switch for selecting a type of medium over which to transmit and receive the data signals.

The above aspect may include one or more of the following features. The type of medium may be a wired medium or a wireless medium. Circuitry may be included in the communication card, which triggers the switch (or switches) in response to detecting a wired medium interface. The circuitry may include a line presence indicator. The switch may be triggered to operate the modem in wired mode when the line presence indicator detects the wired medium and the switch may be triggered to operate the modem in wireless mode when the line presence indicator does not detect the wired medium.

Other features and advantages of the invention will become apparent from the following description, including the claims and drawings.

DETAILED DESCRIPTION

Figure 1:
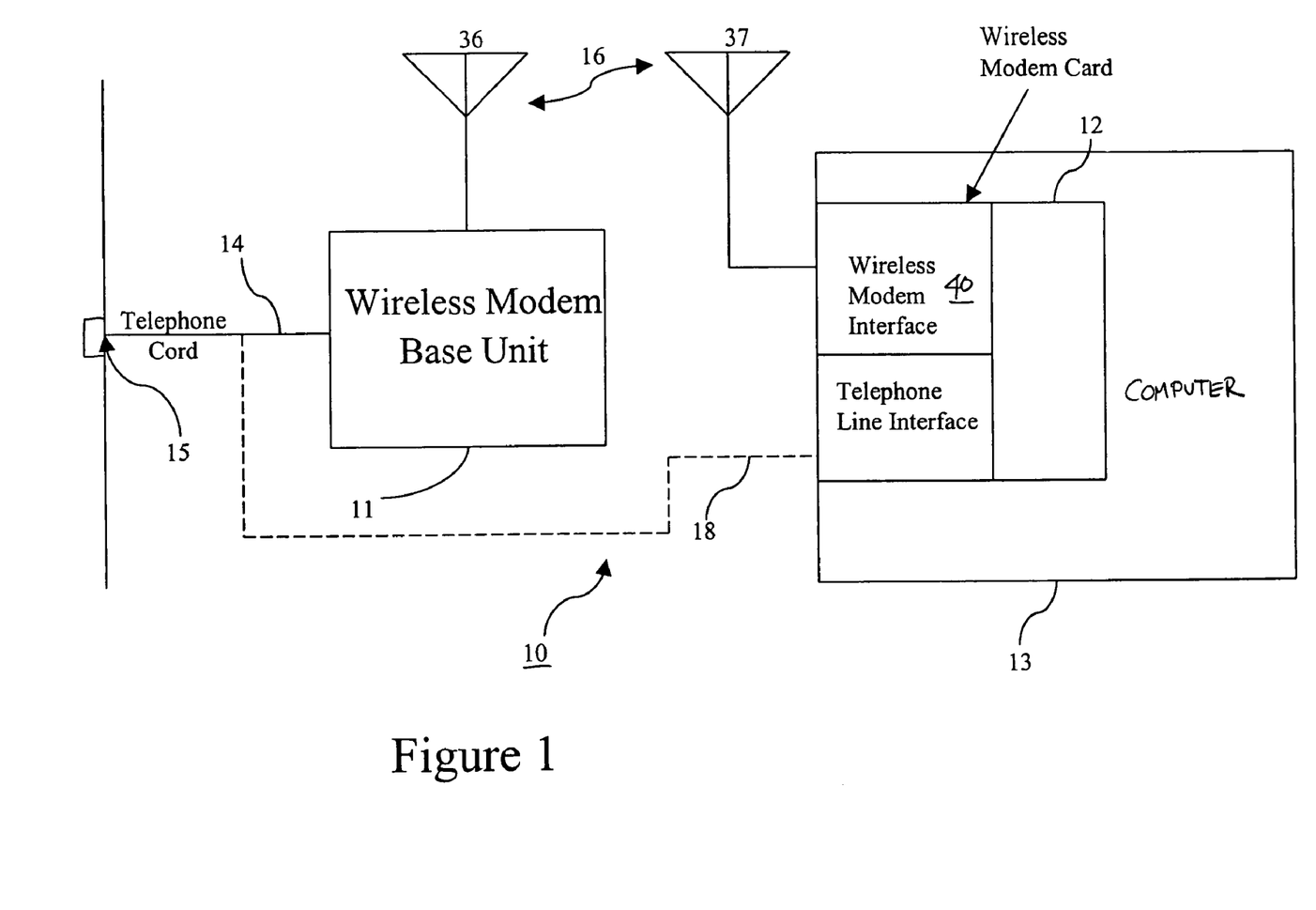
FIG. 1 is a block diagram of a wireless modem.

FIG. 1 shows a wireless modem 10. Wireless modem 10 includes a base unit 11 and a wireless modem card 12. Wireless modem card 12 interfaces to a computer 13. Wireless modem card 12 may be incorporated into a PCMCIA (Personal Computer Memory Card International Association) card, also called "PC card", for a laptop computer; a PCI/mini-PCI (Peripheral Component Interconnect) card for a desktop personal computer (PC); or a USB (Universal Serial Bus) device.

Base unit 11 connects to the Public Switched Telephone Network (PSTN) through a two-wire telephone cord 14 plugged into a telephone wall jack 15. Communication (e.g., data exchange) between base unit 11 and wireless modem card 12 may be via a radio frequency (RF) link 16 or other type of wireless link.

RF link 16 transmits standard telephone channel spectrum, also called "voiceband" frequencies, which extend from 0.1 to 4 kHz. Thus, voiceband modem signals can be sent over the wireless (radio) channel. Modem signals may operate according to the latest international (ITU) standards for dial-up connections, such as V.34 and V.90, providing a data speed of up to 56 kilobits/second (kb/s). The range of the RF link may vary, but it is typically several hundred feet or longer.

As described below, wireless modem 10 can also operate in a "wired" mode. In the wired mode, wireless modem 10 uses a standard telephone line to mate to telephone wall jack 15. In the wired mode, data is transmitted over the telephone line rather than over RF link 16. As such, base unit 11 is not required.

Base Unit

Figure 2:
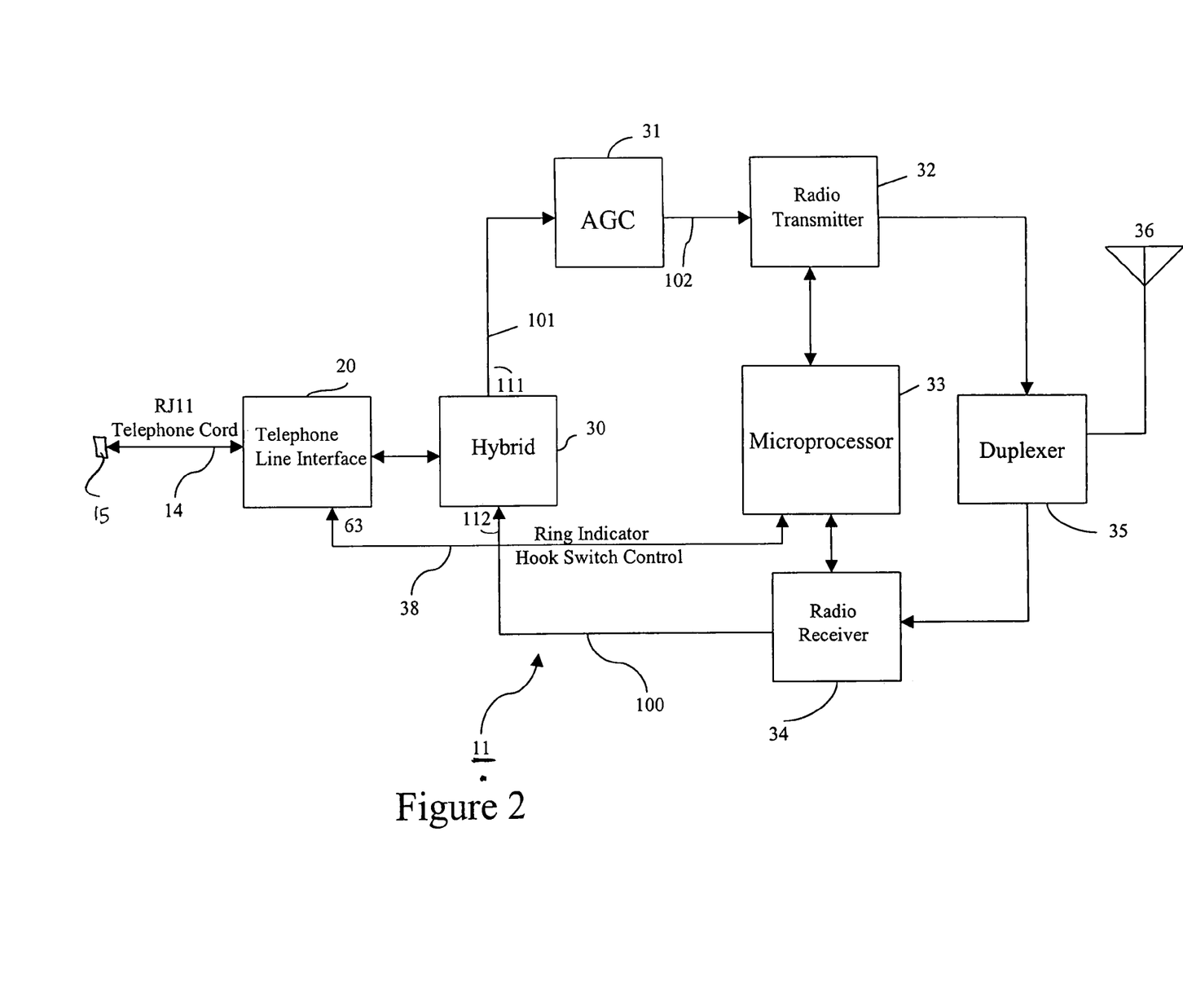
FIG. 2 is a block diagram of a base unit used in the wireless modem.

FIG. 2 shows a block diagram of base unit 11. Base unit 11 includes a telephone line interface 20. Telephone line interface 20, which is also referred to as a data access arrangement (DAA), couples base unit 11 to a standard two-wire, twisted pair, telephone line, generally referred to as "tip" and "ring" wires, via cord 14 and jack 15.

Figure 3:
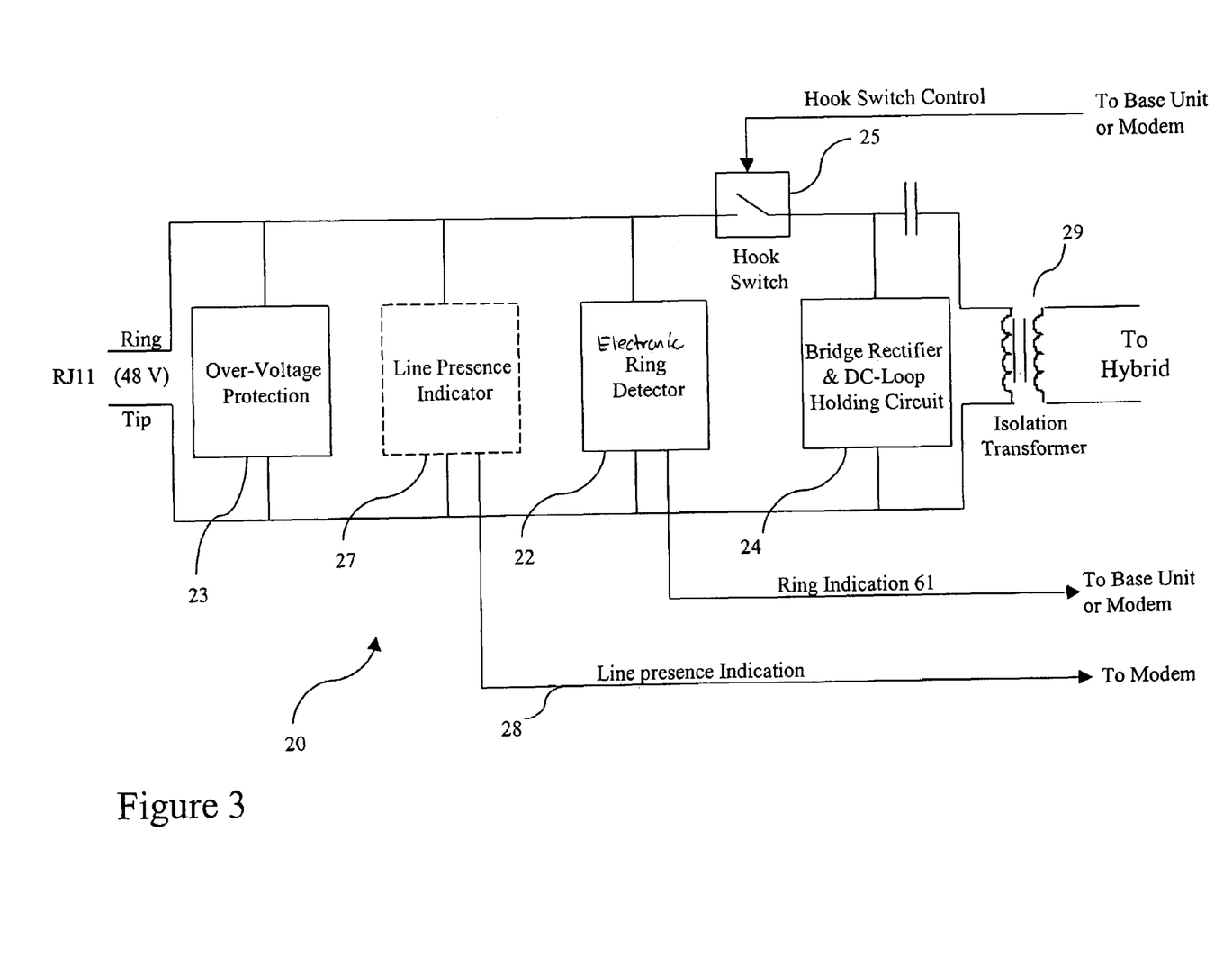
FIG. 3 is a block diagram of a telephone line interface in the base unit.

Circuitry included in telephone line interface 20 is shown in FIG. 3. This circuitry couples base unit 11 to the telephone line and, thus, to equipment in a central office. The circuitry includes an electronic ring detector 22, overvoltage protection circuit 23, bridge rectifier (and DC loop holding) circuit 24, and hook switch circuit 25.

Electronic ring detector 22 receives, and responds to, a ringing signal transmitted to base unit 11 from the central office. The ringing signal indicates that a connection is being made from a remote device to the wireless modem. This ringing signal may be a high voltage, low frequency signal. A 90 Vrms (root-mean-square voltage), 15 to 68 Hz (hertz) signal is typically used. Zener diodes (not shown) prevent signals smaller than 12V from triggering electronic ring detector 22.

Overvoltage protection circuit 23 protects against high voltages that may be induced on the telephone line, e.g., by lightning or other electrical phenomena. Overvoltage protection circuit 23 may be implemented using Zener diodes and varistors in this embodiment.

Bridge rectifier circuit 24 protects against improper voltage polarity on the telephone line due, e.g., to incorrect connection of the lines or to changes in polarity of a battery located at the central office. Bridge rectifier circuit 24 may be implemented using a four-diode, full-wave rectifier. The DC-Loop holding portion of bridge rectifier circuit 24 maintains DC current in the telephone line at a relatively constant level, such as 25 mA independently of the length of the telephone line. A transformer 29 provides additional isolation from the telephone line for integrated circuits in base unit 11.

Hook switch circuit 25 connects base unit 11 to the telephone line. Hook switch circuit 25 seizes the telephone line by drawing DC current from the central office battery, thus indicating to the central office that the line has gone off-hook. "Off-hook" refers to the state of a telephone connection in which signals may be transmitted and is analogous to a telephone handset going off-hook. The DC current may vary from 20 to 120 mA depending on the distance between the telephone line and the central office. Hook switch circuit 25 may be implemented using a single solid-state relay or an opto-coupler.

Line presence indicator 27, also shown in FIG. 3, need not be present in base unit 11. Line presence indicator 27 may be implemented within the DC Loop Holding portion of circuit 24, through which a DC current is flowing whenever the telephone is in use. The operation of line presence indicator 27 is described with respect to FIG. 6.

Referring back to FIG. 2, base unit 11 also includes hybrid circuit 30, automatic gain control (AGC) circuit 31, radio transmitter 32, microprocessor 33, radio receiver 34, duplexer 35, and antenna 36.

Microprocessor 33 controls the functions of base unit 11 through interaction with telephone line interface 20, radio transmitter 32 and radio receiver 34. Microprocessor 33 also sends and receives control signals to and from wireless modem card 12.

Radio transmitter 32 translates a voiceband data signal from the telephone line to a modulated RF signal. Radio receiver 34 translates a modulated RF signal to a voiceband data signal. Radio transmitter 32 and radio receiver 34, which operate on different frequencies, are connected to common antenna 36 using duplexer 35. RF signals are transmitted and received to/from wireless modem card 12 over antenna 36. The RF signals may be modulated by radio transmitter 32 using a variety of techniques, ranging from analog FM (frequency modulation) to digital FM, such as frequency shift keying (FSK) and digital spread spectrum techniques.

Selection of the modulation method is largely dictated by the characteristics of the voiceband data signal. The V.34 signal, for instance, has a complex multi-state QAM (Quadrature Amplitude Modulation) constellation and resembles an analog baseband signal transmitted in the 4 kHz telephone channel. The V.90 signal is somewhat special in that it is comprised of a pulse amplitude modulated (PAM) signal with 128 discrete amplitude levels, which are unequally spaced according to the mu-law expander used in the digital Public Switched Telephone Network (PSTN).

Accurate transmission of dial-up modem-type signals requires a channel that is characterized by low noise and high amplitude linearity. One way to transmit such signals, in accordance with the invention, is to transmit the signals over an RF (or "radio") channel by direct (analog) frequency modulation (FM) of an RF carrier with a V.34 or V.90 signal. For V.90 signals, this transmission method actually amounts to transmitting an FSK signal with 128 unequally spaced discrete levels. The RF bandwidth required to transmit such signals could be a modest 30 kHz, which is similar to the RF bandwidth used for the analog FM channel in conventional cordless telephones, but higher bandwidths may sometimes be desirable to increase signal-to-noise ratio.

Base unit 11 uses analog FM modulation, a method also widely used in cordless telephones working at 900 MHz or lower. As noted above, for a V.90 signal, this modulation method amounts to FSK with unequally spaced levels. Analog modulation substantially avoids the quantization noise associated with the analog-to-digital and digital-to-analog conversions required for digital RF modulation that degrades the V.90 signal. Analog modulation also does not require the higher bandwidths (e.g. 200 kHz) required for digital RF modulation.

With analog FM, a V.90 signal is directly applied to an FM deviator in radio transmitter 32. Since a V.90 data signal is itself a PAM signal, this results in a multi-level FSK RF signal over the air. The FM deviator is able to meet the stringent linearity requirements of V.90 with relative ease. If necessary, nonlinear distortions can be reduced further by adding circuitry to limit or reduce the signal amplitudes applied to the FM deviator. In general, the FM channel is a stable transmission medium with a baseband gain that is essentially unaffected by a change in RF signal levels (fading).

Hybrid circuit 30, which includes a resistive hybrid and operational amplifiers (not shown), converts two-wire to four-wire telephone operation. More specifically, one function of hybrid circuit 30 is to separate two signals simultaneously flowing in opposite directions in the two-wire telephone line (so called "full-duplex operation") and make them available at two distinct terminals (four wires) 111 and 112. An incoming data signal (from the central office) appears at terminal 111 and an outgoing data signal (to the central office) is applied to terminal 112.

Since hybrid circuit 30 is a bridge circuit, isolation of the two signals at terminals 111 and 112 is only achieved if all of the impedances connected to the bridge circuit are well-matched. A considerable impedance mismatch, for instance, due to distance variation between a user and a central office, can exist, which can cause the signal applied to terminal 112 to be partially reflected from the telephone central office and appear at terminal 111. This "echo" will be added to the incoming signal, causing the amplitude of the resulting signal 101 to be, for instance, several times the amplitude of the desired signal.

The resulting signal 101 (with echo) can cause overload and nonlinear distortion in radio transmitter 32. Echoes, embedded in signal 101, after having been corrupted by nonlinear distortion, cannot be effectively eliminated by the echo canceller in modem circuits 41 of computer 13. Therefore, to reduce overload and nonlinear distortion, AGC circuit 31 is included in base unit 11 between hybrid circuit 30 and radio transmitter 32. AGC circuit 31 includes a peak amplitude detector with a time constant that is long enough to keep the peak amplitude of the combined output signal 102 substantially constant and within the linear amplification range of radio transmitter 32. Since AGC circuit 31 reduces nonlinear distortions, RF link 16 essentially becomes invisible to the modem data signal. Thus, an echo canceller in modem circuits 41 will be able to cancel substantially all of, and in some cases all of, the echo appearing at terminal 111.

AGC circuit 31 also keeps the signal amplitude at terminal 102 from falling to low levels, as would be the case for very long "loops" to the central office. Low signal amplitudes result in low signal-to-noise ratios on the RF channel used for transmission.

In contrast to applications of AGC circuits at intermediate frequencies where nonlinear distortion is not an issue, AGC circuit 31 operates at baseband frequencies where linearity requirements become stringent. One way to meet these requirements is to use special linearized junction devices with gains that can be changed using a control voltage. Another way to meet these requirements is to use resistive step attenuators controlled by digital commands to control the gains.

Gain control may be direct or through feedback. Direct control involves measuring an incoming voltage 101, followed by adjusting voltage gain to achieve a constant output signal 102. Feedback control, on the other hand, involves measuring output 102 and keeping it constant through a gain or attenuator adjustment.

One goal of AGC operation is to obtain a fixed gain (or attenuation) setting, which optimizes the data channel in normal operation. This process is complicated, however, by the start-up procedure (i.e., the "handshake") used in V.34 and V.90 data modems. This startup procedure includes several phases lasting for several seconds, in which signals of varying amplitudes are transmitted in both directions of transmission. The procedure assumes that the gain of the system is fixed and remains so for subsequent data transmission. This requires the gain of AGC circuit 31 to be set even before the first start-up signals are exchanged. This can be achieved by measuring the level of the dial tone obtained from the telephone company central office.

The dial tone is the first signal received. Its level is specified by standards organizations. The dial tone also has a fixed decibel (dB) relationship to the average transmitted level of the data signal. The dial tone therefore allows the gain of AGC circuit 31 to be set (either by forward or feedback control) to produce a voltage 102 close to the optimum for subsequent data transmission. The dB relationship "X" between the dial tone level and voltage 102 can be determined experimentally, using typical echo situations in the "loop". Unusually severe echoes would require lowering voltage 102 in order to avoid increased nonlinear distortion in the RF channel used for transmission. This could be achieved by increasing the value of X in steps of 1 dB, for instance.

The other possibility for lowering voltage 102 is to measure the DC current of the telephone loop. The AGC gain is set according to the loss of the telephone loop, which is based on the distance of a user and the central office. The DC current of the telephone loop provides a measurement of the loss due to distance. This can be used as a gauge for the AGC gain.

Imperfect echo cancellation, thermal noise (poor signal-to-noise ratio), and interference are sources of transmission errors, although there may be other sources. These may cause modem circuits 41 (FIG. 4, described below) to revert to half duplex operation, to reduce data transmission speed (e.g., from 56 kb/s), and/or to initiate an automatic request for retransmission of a data signal.

Security features may also be provided on base unit 11. For example, to prevent unauthorized over-the-air access of base unit 11, a security code may be used. There may be from 65,000 to one million different codes (also called "keys") available, from which one may be randomly selected by a user.

Wireless Modem Card

Figure 4:
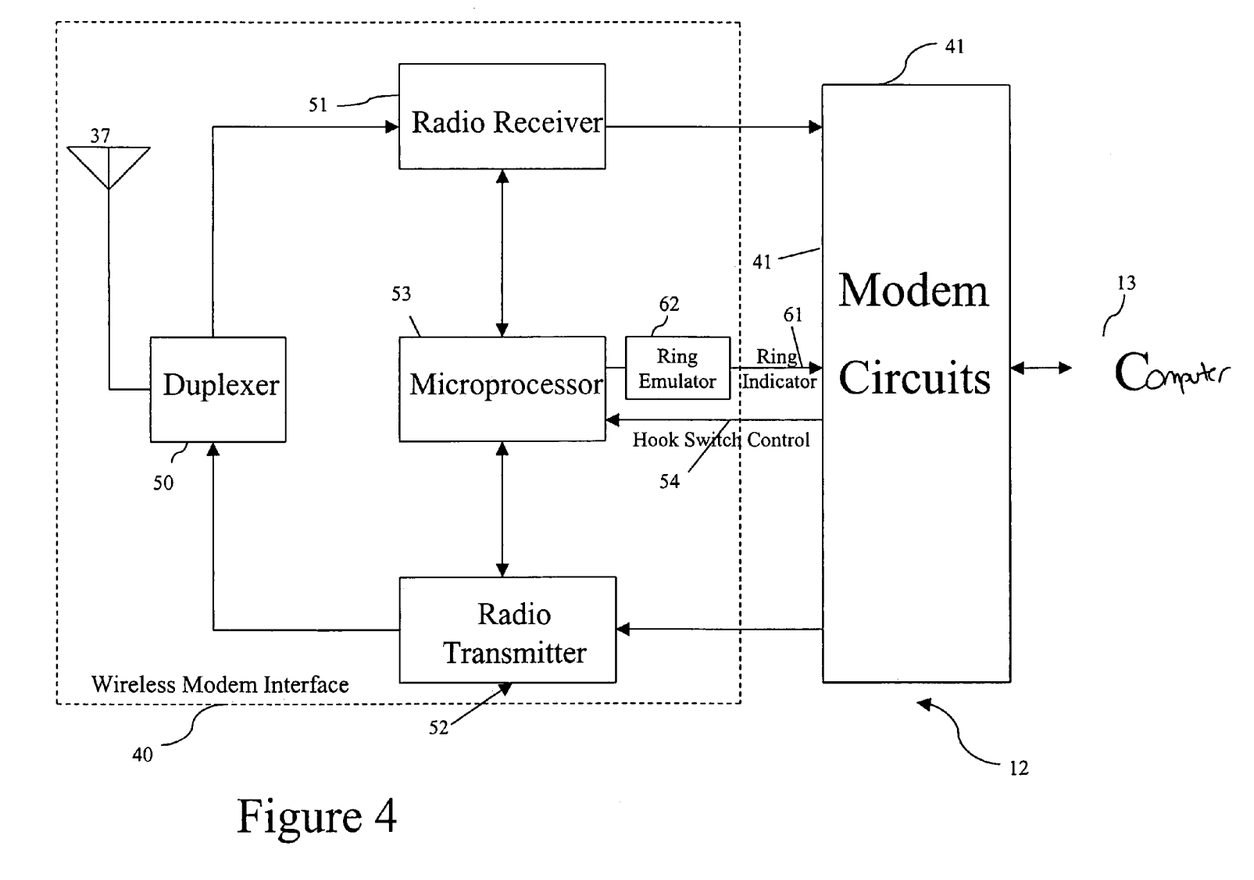
FIG. 4 is a block diagram of a wireless modem card used in the wireless modem.

FIG. 4 shows a block diagram of wireless modem card 12. Wireless modem card 12 includes a wireless modem interface 40 and modem circuits 41. Modem circuits 41, shown in FIG. 5, include a coder/decoder (codec) 42, a digital signal processor (DSP) 43, a controller 44 and its associated memory, and a computer interface 45.

Figure 5:
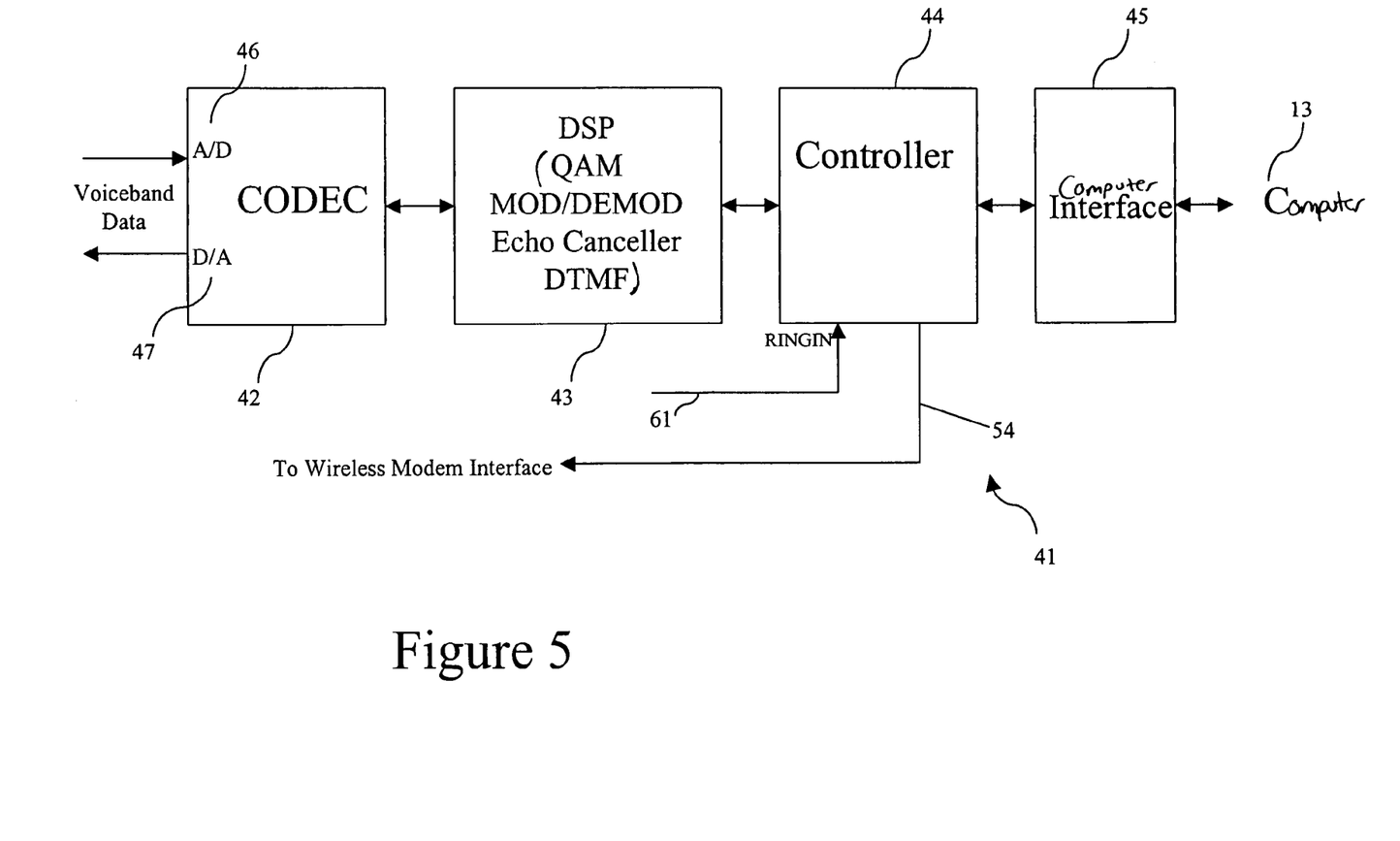
FIG. 5 is a block diagram of modem circuits used in the wireless modem card.

Codec 42 receives analog voice-band data signals from wireless modem interface 40 (over RF link 16) and receives a data signal from DSP 43. Codec 42 includes an A/D converter 46 for converting an incoming data signal (from base unit 11) from analog to digital form, and a D/A converter 47 for converting an outgoing data signal (a signal going to base unit 12) from digital to analog form.

DSP 43 performs pulse amplitude modulation (PAM) for V.90 or quadrature amplitude demodulation (QAM) for V.34 and echo canceling on incoming data signals, and PAM or QAM modulation on outgoing signals. DSP 43 also generates and detects DTMF (dual tone multi-frequency) touch-tone dialing signals. The touch-tone dialing signals are used to connect to a remote network device. PAM routines running in DSP 43 use 128 levels and QAM routines running in DSP 43 use 1024 or higher QAM states. Echo canceling routines running in DSP 43 include typically a 128-tap delay line having tap weights set by a training sequence that is performed before data transfer begins.

Controller 44 performs control functions required by wireless modem 10. These may include facsimile transmit and receive functions. For example, at the request of computer 13, controller 44 may initiate a call to a remote computer by sending an off-hook command 54, which, in turn, turns on the transmitter of wireless modem interface 40. Wireless modem interface 40 then selects a frequency not in use by other devices in the vicinity and sends base unit 11 a command to establish a wireless RF link 16 between base unit 11 and wireless modem card 12. It is noted that initiation of a call from computer 13 turns on the transmitter of the wireless modem interface in the same way as a handset in a cordless phone. In a standard cordless telephone, when the ON (or PHONE) switch of a handset is turned on, it starts a chain of actions to enable the cordless handset to establish a wireless connection with its base unit. The receiver of the wireless modem is always turned on to receive any incoming calls. In this embodiment, the same mechanisms used in a cordless telephone may be used to establish the wireless connection between base unit 11 and wireless modem card 12. This means that algorithms used by standard cordless telephone may be used. The end result is that hook switch 25 in telephone line interface 20 is turned on, and a dial tone from the telephone central office is received, via base unit 11 and through RF link 16, by wireless modem card 12. There, controller 44 of modem circuits 41 recognizes the dial tone. The wireless modem is now ready to dial. Under control of computer 13, modem circuits 41 generate DTMF touch-tone signals to dial the call.

Since the touch-tone DMTF signals reside within the voiceband channel, they are carried over the RF link 16 to reach base unit 11 and, from there, the signals are sent by base unit 11 to the telephone central office. Neither wireless modem interface 40 (wireless modem card 12) or telephone line microprocessor 33 (base unit 11) generate DMTF (i.e., dialing) signals. All dialing functions, including hook switch control 54, are initiated by computer 13.

Controller 44 (FIG. 5) answers an incoming call by receiving and recognizing a ring indicator 61 from ring detector 22 in base unit 11 (via microprocessor 53). In response, controller 44 initiates an "off-hook" operation. Another function of controller 44 is to terminate a call at the request of computer 13 by sending an "on-hook" signal 54 to hook switch 25 in base unit 11.

Computer interface 45 couples modem circuitry 41 to computer 13. Data is transferred between computer 13 and wireless modem card 12 over computer interface 45. Computer interface 45 may be a standard PCMCIA connection for portable computers and a PCI connection for desktop computers. Other interface connections may be used.

Referring back to FIG. 4, wireless modem interface 40 includes an antenna 37, a duplexer 50, a radio receiver 51, a radio transmitter 52, and a microprocessor 53. The operation of these circuits is similar to the operation of the corresponding circuits described above with respect to FIG. 2. That is, as described below, the circuitry is used to exchange data with base unit 11, such that when wireless modem card 12 transmits data, base unit 11 receives the data, and vice versa.

Wireless modem card 12 communicates with base unit 11 over RF link 16. Wireless modem card 12 receives a ring indication from base unit 11 when base unit 11 receives an incoming call. Ring detector 22 in base unit 11 detects the presence of a ringing signal and transmits a corresponding signal to the wireless modem card 12. In standard cordless telephones, a logic-type signal starts a ringer oscillator and its associated piezoelectric buzzer. Since a logic-type signal is not generally recognized by modem circuits 41, this information is converted into a modem-compatible signal 61 in ring emulator 62 (FIG. 4). From modem circuits 41, a ring indication is transmitted to computer 13, where it indicates an incoming facsimile transmission or a request to operate computer 13 from a remote location, such as from a home or office. Computer 13 will then acknowledge receipt of the incoming call and issue the off hook command to establish an incoming call.

As noted, a logic-type ring detection signal received by wireless modem interface 40 is converted into a form that is recognizable by modem circuits 41. This is because a regular ringing signal is a low frequency 90 Vrms AC voltage and normally received by a ringer detection circuit of DAA 20 (FIG. 3) that contains an opto-coupler in its output. This opto-coupler acts as a full wave rectifier for the sinusoidal ringing voltage. The ring indication signal of FIG. 3 therefore includes low voltage, fullwave rectified 15 to 68 Hz sinewave pulses. This signal is normally applied to the input "RINGIN" pin of controller 44. Controller 44 measures the period length of the pulses and determines whether the pulses are within the specified frequency range of 15 to 68 Hz. With this as a background, the conversion is performed in ringer emulator 62 via a square wave oscillator operating in the 15 to 68 Hz range, followed by a low-pass filter to round off the square edges, and finally a fullwave rectifier. The resulting output comprises ring indicator signal 61.

As noted above, a logic-type signal is not recognized by the "RINGIN" (or "RINGD") input pins of commercially available controllers 44. Some controllers, however, generate a logic signal output in response to a full-wave rectified ringer signal applied to input pin "RINGD". This logic signal may appear at pins "R1" or "STSCHG" of the controller for transfer to computer interface 45 and computer 13. In this case it is possible to use the logic ring indication signal from microprocessor 33 directly, eliminating the need for ring emulator circuit 62. The logic signal is then simply substituted for the output signals at pins "R1" or "STSCHG" of controller 44.

To acknowledge or to initiate an incoming call, a hook switch control command is generated by computer 13 and sent to controller 44, which in turn generates a hook switch control signal 54. This signal first turns on ("ON" or "PHONE" functions) the power of transmitter 52 of wireless modem interface 40 and establishes the wireless link between wireless modem card 12 and base unit 11. It then sends the hook switch control signal back to base unit 11 (FIG. 2), which causes the central office to send a dial tone, via base unit 11, back to wireless modem card 12 and computer 13. The hook switch control signal is typically a voltage that lasts for the duration of a call.

Wired Option

Figure 6:
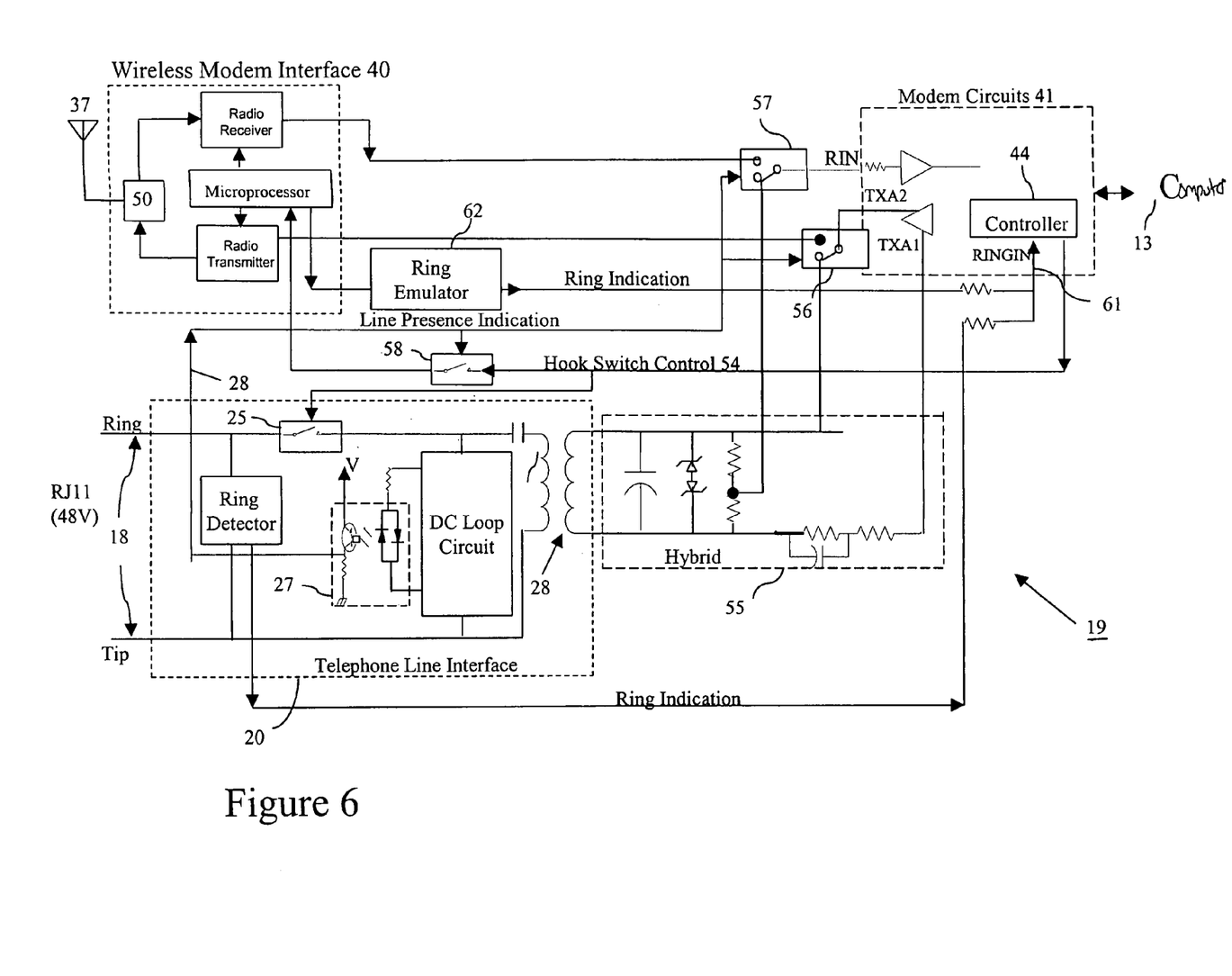
FIG. 6 is a block diagram of an alternative embodiment of the wireless modem, which includes a "wired" option.

Wireless modem 10 can also be equipped with circuitry for operation as a wired modem. An embodiment of a wireless modem 10 with this circuitry is shown in FIG. 6. The embodiment of FIG. 6 incorporates standard modem circuitry, including telephone line interface 20 and a hybrid circuit 55, both of which are similar in structure and function to corresponding circuits described above. Hybrid circuit 55 is of the resistive type, fed from a balanced operational amplifier ("OpAmp") (terminals TXA1 and TAX2), and picking up the signal traveling in the opposite direction by an unbalanced OpAmp (terminal "RIN"). Both OpAmps are a standard feature of modem circuits 41. Switches 56 and 57 select either the wired or the wireless modes of operation. These switches, which are implemented electronically (by CMOS switches, for instance), are operated automatically when telephone cord 18 is used for modem communication. The switch control signal 28, also called the line presence indication, is generated in line presence indicator circuit 27 of telephone line interface 20. Circuit 27 shows an opto-coupler connected across the incoming telephone line. Since there is always a DC voltage applied to telephone line 18 at the telephone central office, voltage 28 is therefore present as long as the telephone connection remains intact.

Switches 56 and 57 are triggered to operate the modem in wired mode when the line presence indicator 27 detects the wired medium and switches 56 and 57 are triggered to operate the modem in wireless mode when the line presence indicator 27 does not detect the wired medium. In addition, switching voltage 28, in conjunction with switch 58, is also used to power-off wireless modem interface 40 when operation is through telephone cord 18.

Wireless modem 10 is not limited to use with the hardware/software configuration of FIGS. 1 to 6; it may find applicability in any computing or processing environment.

Wireless modem 10 is also not limited to transmitting data over the RF frequency bands described above, or to the specific modulation techniques described herein. Techniques and/or transmission methods other than those described above may be used.

Other embodiments not described herein are also within the scope of the following claims.

What is claimed is:

1. An apparatus comprising:
   a base unit for coupling to a telephone line; and
   a remote unit for communicating with the base unit over a wireless medium;
   wherein the base unit includes a transmitter for direct analog modulation of an original analog voiceband data signal received over the telephone line and transmitting the modulated signal over the wireless medium, and level control circuitry coupled to the transmitter that controls a level of the original analog voiceband data signal to be substantially in a linear range of the transmitter;

wherein the remote unit includes a receiver for receiving the modulated signal over the wireless medium and direct analog demodulation of the original analog voiceband signal, and an interface to a modem circuit for decoding a data stream encoded in the original analog voiceband signal;

wherein the level control circuitry that controls a level of the signal comprises an automatic gain control circuit that controls a peak level of the signal; and wherein the automatic gain control circuit uses a dial tone of a telephone connection or a DC current of a telephone loop to set a gain level for the original signal at a beginning of communication, the gain level remaining substantially constant during communication.

2. The apparatus of claim 1, wherein the data signal is transmitted over a radio channel using multi-level frequency shift keying (FSK) modulation.

3. The apparatus of claim 1, wherein the remote unit is in communication with the base unit and a computer, the remote unit receiving an original voiceband data signal from the computer, generating an RF modulated signal based on the original signal from the computer, and transmitting the RF modulated signal to the base unit.

4. The apparatus of claim 3, wherein the remote unit includes an RF transmitter and an RF receiver, the remote unit establishing wireless communication with the base unit, the remote unit communicating with the base unit by wireless communication via the RF transmitter and the RF receiver and the remote unit communicating with the computer via a wired link.

5. The modem of claim 3, wherein the remote unit includes a switch for selecting a type of medium over which to transmit and receive the data signal.

6. The apparatus of claim 1, wherein
the base unit includes a ring detector coupled to the telephone line for detecting a ring signal on the telephone and providing a ring indication signal to the transmitter for transmission over the wireless medium to the remote unit; and
the remote unit includes a ringer emulator coupled to the receiver for receiving the ring indication signal and emulating a ring signal on a telephone interface.

7. The apparatus of claim 1 wherein the remote unit further comprises a modem circuit coupled to the remote unit.

8. The apparatus of claim 7 wherein the modem circuit includes an echo canceller for reducing echoes on the demodulated original analog voiceband data signal and a CODEC for decoding the original analog voiceband data signal.

* * * * *